United States Patent [19]

Kuo

[11] Patent Number: 5,382,281

[45] Date of Patent: Jan. 17, 1995

[54] SELF-POLISH TYPE ANTIFOULING COATING COMPOSITION

[75] Inventor: Ping-Lin Kuo, Kaohsiung, Taiwan, Prov. of China

[73] Assignee: Yung Chi Paint & Varnish Mfg Co., Ltd., Kaohsiung, Taiwan, Prov. of China

[21] Appl. No.: 112,427

[22] Filed: Aug. 26, 1993

Related U.S. Application Data

[63] Continuation of Ser. No. 713,759, Jun. 11, 1991, abandoned.

[51] Int. Cl.$^6$ .................................................. C09D 5/20
[52] U.S. Cl. ................................. 106/2; 106/8; 106/18; 106/287.18; 106/287.19; 106/18.36; 523/122; 523/177
[58] Field of Search .................................. 106/2-8, 106/15.05-18.36, 287.18, 287.19; 523/122, 177; 424/405, 406; 514/492-505

[56] References Cited

U.S. PATENT DOCUMENTS

| | | | |
|---|---|---|---|
| 2,411,938 | 5/1941 | Ratner | 260/19 |
| 2,423,044 | 6/1947 | Nowak | 260/434 |
| 3,308,078 | 3/1967 | Rogers et al. | 260/27 |
| 3,817,761 | 6/1974 | Brake | 106/15 AT |
| 3,898,190 | 8/1975 | Willey | 360/27 R |
| 4,654,380 | 3/1987 | Makepeace | 523/122 |
| 4,774,080 | 9/1988 | Yamamori et al. | 424/78 |

FOREIGN PATENT DOCUMENTS 0204456  12/1986  European Pat. Off. ........ C08K 5/48

OTHER PUBLICATIONS

Hawley's Condensed Chemical Dictionary 11th edition (revised by Sax & Lewis Jr.), 1987, p. 1049.

*Primary Examiner*—Paul Lieberman
*Assistant Examiner*—Margaret Einsmann
*Attorney, Agent, or Firm*—Merchant, Gould, Smith, Edell, Welter & Schmidt

[57] ABSTRACT

A self-polishing antifouling coating composition comprises a metallic soap resin which is prepared by reacting a metal compound containing a metal having a valency of at least 2 with an unsaturated fatty acid, a mixture of unsaturated fatty acids, or a mixture containing at least one saturated fatty acid and other saturated organic acids.

12 Claims, No Drawings

SELF-POLISH TYPE ANTIFOULING COATING COMPOSITION

This is a continuation, of application Ser. No. 07/713,759, filed Jun. 11, 1991, now abandoned.

BACKGROUND OF THE INVENTION

1. Field of the Invention

This invention relates to a self-polish type antifouling coating composition and particularly to a coating composition comprising a polymerizable metal soap of fatty acid.

2. Brief Description of the Prior Art

Antifouling marine paints are mainly divided into two types, a self-polish type and an insoluble matrix type. The self-polish type antifouling paint can be gradually hydrolyzed and polished by sea water to produce a smooth and fresh surface which reduces the friction between the ship surface and water, thereby decreasing the sailing energy. The fresh surface exposes antifouling toxins contained in the coating until they are used up.

Self-polishing coatings generally comprise a resin containing hydrolyzable groups such as organic acid groups. The rate of hydrolysis of such coatings depends on the type of cation and acid and the percentage of acid groups in the resin.

Self-polishing antifouling coatings may be a toxin-containing type or a toxin-free type. Coatings containing toxins such as organotin are tin substituted polyacrylates which have been popular due to their excellent antifouling properties and self-polishing properties. However, such coatings are subject to legal restriction because of their extreme toxicity. Copper-containing antifouling coatings are less toxic and may incorporate additive toxins if desired. Examples of such coatings are disclosed in JPN Kokai, Tokkyo Koho JP 6,284,168, JP 6,094,471, European Patent Application Nos. EP26,958 and EP204,456. Toxin-free antifouling coatings themselves are not toxic and require additive toxins. Examples of such non-toxic coatings are disclosed in JPN Kokai, Tokkyo Koho, JP 01,131,285, JP 63,314,280 and JP61,218,668.

U.S. Pat. No. 4,774,080 discloses a hydrolyzable antifouling coating composition which has an excellent film-forming property and whose resin is characterized by having at the side chain portions a particular group capable of forming a hydrophilic group through hydrolysis, being hydrolyzed and dissolved in sea water at an appropriate rate and being prepared without the necessity of using a triorganotin compound which is an expensive and toxic material. The particular group at the side chain contains cations of a metal selected from zinc, copper and tellurium. The resin is a linear polymer and forms a non-crosslinked thermoplastic film.

SUMMARY OF THE INVENTION

An object of this invention is to provide a hydrolyzable or self-polishing antifouling coating composition which comprises a film forming, low viscosity metal soap of unsaturated fatty acid and which does not require the use of expensive tin metal compounds but is still effective for antifouling because of its accessibility to a high loading of antifouling or toxic agent, attributable to its low viscosity.

Soaps prepared from high hydrophobic saturated acids such as fatty acids or naphenic acids and compounds of multi-valent metals such as Co, Mn, Zn, Cu, Ca, etc., are well known commercial products such as driers and catalysts, the paint industry. Those soaps are water insoluble but hydrolyzable slowly. The rate of hydrolysis depends on the kind of acids and cations contained in the soaps. This means that by changing the acid and cation, the hydrolysis rate can be adjusted. These metallic soaps cannot be used as a binder for a coating composition. However, the metallic soap prepared from unsaturated fatty acid such as linolenic acid, according to the present invention can form film when exposed to air at normal room temperature, in the presence of a drier.

According to the present invention, a hydrolyzable coating composition comprises a metallic soap resin having the formula

$$R1—A1—M—A2—R2$$

wherein R1 is an unsaturated aliphatic hydrocarbon or an alkenyl group derived from an unsaturated fatty acid or a fatty alcohol, M is a metal having a valency of at least 2, A1 and A2 are independently a functional group of a carboxylic acid, sulfuric acid or phosphoric acid, R2 is a residue of unsaturated or saturated organic acid an alicyclic monovalent organic acid or alcohol, or an acrylic oligomer.

The metallic soap of an unsaturated fatty acid or oil has a linear chain structure and can be cured to a crosslinked film by an exposure to oxygen present in the air in the presence of a drier. Since the unsaturated metallic soap has a very low viscosity, a large amount of antifouling agent such as CuO can be added. The accessibility to load a high amount of toxins is important for an antifouling coating which does not use any expensive and strong toxin such as a tin compound, so as to achieve a long-lasting antifouling effect.

The crosslinking density of the film formed according to the present invention can be adjusted by changing the amount and type of the unsaturated fatty acid. The incorporation of a saturated fatty acid will decrease the crosslinking density and influence the film properties. In turn, the crosslinking density and the film properties influence the rate of hydrolysis.

The above-described metallic soap resin can be prepared by reacting a metallic compound with an unsaturated fatty acid, a mixture of unsaturated fatty acids or a mixture containing one of more unsaturated fatty acid and a saturated organic acid. In addition, other polymers can be blended with the metallic soap resin to modify the properties of the soap resin.

The unsaturated fatty acid useful for this invention are oleic acid, linoleic acid, linolenic acid, oleostearic acid, laconic acid, ricinoleic acid, erucic acid. Other useful fatty acids are those obtained from oils of castor, soybean, corn, cotton seed, linseed, oiticica, perilla, poppyseed, rapeseed, safflower, sunflower, tall, tung, walnut, herring, menhaden and sardine. Other unsaturated organic acids are available. The above unsaturated acids can be converted into a fatty alcohol which in turn can be used to prepare a phosphoric or sulfonic acid containing an unsaturated aliphatic group.

The metallic compound may be an oxide, a hydroxide or a chloride. Most of the metals in the Periodic table with a valency of at least 2 can be used in the present invention. They may be the metals belonging to Group Ib, IIa, IIb, IIIa, IIIb, IVa, IVb, Va, Vb, VIIa and VIII. The metals used for preparing the metallic soaps influence the rate of hydrolysis. Soaps of alkali metals are readily soluble in water. The soaps of alkaline earth metals are water insoluble but hydrolyzable in water. Different alkaline earth metals may result in different hydrolysis rates of soaps. For example, an alkaline earth metal with a higher molecular weight such as barium shows a slower hydrolysis rate than other alkaline earth metal having lower molecular weight such as magnesium. The rate of hydrolysis also varies when using metals of Group III, IV and transition metals such as Al, Co, Zn, Mn, Co, etc.

The saturated organic acids useful for the present invention may be those containing —COOH, —OSO3H— or —O—PO3H3. These acids may be an aliphatic, aromatic, alicyclic monovalent organic acid, or a natural acid selected from acetic acid, propionic acid, butyric acid, valeric acid, caproic acid, caprylic acid, capric acid, laurie acid, myristic acid, palmitic acid, stearic acid, benzoic acid, phathalic acid, toluic acid, salicylic acid, nitrobenzoic acid, chlorobenzoic acid, toluene sulfonic acid, naphthenic acid, rosinic acid and various natural fatty acids.

Other saturated organic acids useful for the present invention may be a polymer bearing acids such as acrylic copolymers, acrylic-methacrylic copolymers, polyesters bearing —COOH, —OSO3H or —O—PO3H3. Examples of the acrylic copolymers are those prepared from acrylic and/or methacrylic acids, stryene sulfonic acid and/or vinyl monomers. Examples of polyesters are those prepared from polyfunctional alcohols and polyfunctional acids. The function of the polymer herein is not to form film, but is to modify the self-polishing property of the cross-linked film. Therefore, the polymers are not expected to possess the film-forming properties and can be oligomers or low molecular weight polymers.

Polymers which can be blended with the metal soap resin of the present invention may be those soluble in water such as rosinic resin and polyacrylamide, and those containing hydrophilic groups such as carboxylic groups, and polyacrylamide Other useful polymers are polyacrylics, polyesters and polyurethanes containing a carboxylic acid group, a sulfonic acid group, a phosphoric acid group, an amino group or an amide group.

This invention will be now more fully explained in the following Examples.

EXAMPLE 1

In a four-neck reaction kettle, 280 gm of linseed oil fatty acid, 50 gm of Cu(OH) 2 and 200 gm of xylene were mixed, heated slowly to 140 deg C. and maintained at that temperature for two hours to complete the reaction. A clear solution with the solid content of 60% was obtained.

EXAMPLE 2

In a four-neck reaction kettle, 150 gm of tung oil fatty acid, 120 gm of stearic acid, 50 gm of Cu(OH)2 and 200 gm of xylene were mixed, slowly heated to 140 deg C. and maintained at that temperature for two hours to complete the reaction. A clear solution with the solid content of 57% was obtained.

EXAMPLE 3

In a four-neck reaction kettle, 60 gm of methyl methacrylate, 80 gm of butyl acrylate, 60 gm of acrylic acid, 3 gm of butyl mercaptan, 50 gm of n-butanol and 200 gm of xylene were reacted at 120 deg C. for three hours to form a prepolymer. Then, 50 gm of linseed oil fatty acid and 50 gm of Ca(OH)2 were added to the prepolymer and heated to 140 deg C. The reactor was maintained at 140 deg C. for two hours to complete the reaction.

EXAMPLE 4

A resin was prepared following the same procedure of Example 1 from soybean oil fatty acid and Cu(OH)2. An acrylic copolymer is made by using 80 gm of methyl methacrylate, 50 gm of butyl acrylate, 70 gm of acrylic acid, 3 gm of azobis isobutyronitrile and 200 gm of xylene. 50 gm of the acrylic copolymer is blended with 50 gm of the above resin.

EXAMPLES 5-8

Antifouling paints were prepared from the resins of Examples 1-4 using the following formulation:

| Component | Amount (gm) |
| --- | --- |
| Resin | 25 |
| CuO | 40 |
| Bentone #34 | 1.5 |
| Talc | 10 |
| CaCO3 | 5 |
| Xylene | 20 |

The physical properties and antifouling properties of the antifouling paints are summarized in Table 1. Control 1 was prepared from a chloro rubber rosin and Control 2 was prepared from a self-polish organic tin resin.

TABLE 1

| Example | 5 | 6 | 7 | 8 | Control 1 | Control 2 |
| --- | --- | --- | --- | --- | --- | --- |
| Hardness | H | H | H | HB | H | H |
| Viscosity (KU) | 70 | 65 | 85 | 93 | 85 | 93 |
| Impact Resistance[a] 500 g × 50 cm) | F | F | G | G | G | G |
| Antifouling[b] (%) | | | | | | |
| 1 month | 0 | 0 | 0 | 0 | 0 | 0 |
| 3 month | 15 | 10 | 10 | 5 | 30 | 2 |
| 6 month | 45 | 40 | 40 | 30 | 70 | 20 |
| 9 month | 90 | 90 | 70 | 70 | 100 | 60 |

[a]: G: good  F: fair
[b]: Antifouling tests were preformed by dipping the testing plates into the sea, and the antifouling ability is expressed by the percentage of fouling area.

What I claim is:

1. A hydrolyzable antifouling coating composition used in forming by crosslinking, on the surface of a ship, an antifouling coating which is to be submerged in and gradually hydrolyzed in marine water to consecutively produce a smooth and fresh surface, said coating composition comprising:

(a) a metallic soap film-forming binder which has a general formula

$(R1-A1)_n-M-(A2-R2)_m$ wherein R1 is a alkenyl group derived from an unsaturated fatty acid or alcohol, M is a metal having a valency of at least 2, A1 and A2 are independently a functional group of a carboxylic acid, a sulfonic acid or a phosphoric acid, R2 is an unsaturated or saturated residue of an aliphatic, aromatic, alicyclic monovalent organic acid or alcohol, or an acrylic oligomer, and each of n and m=1 or 2, and n+m=2 or 3; and (b) an effective amount of an antifouling agent which is a metallic compound other than the metallic soap of (a) to prevent fouling of coated surfaces of the ship submerged in marine water;

wherein said metallic soap film-forming binder is prepared by reacting a metal compound containing a metal having a valency of at least 2 with a reaction composition comprising at least an unsaturated fatty acid or alcohol, and said metallic soap film-forming binder acts as a film-forming binder for the antifouling agent.

2. A hydrolyzable antifouling coating composition as claimed in claim 1, wherein said reaction composition further comprising an organic acid selected from the group consisting of a carboxylic acid, an organo-sulfonic acid, and an organo-phosphoric acid.

3. A hydrolyzable antifouling coating composition as claimed in claim 1, wherein said reaction composition further comprising a low molecular weight polymeric acid selected from the group consisting of acrylics and polyesters.

4. A hydrolyzable antifouling coating composition as claimed in claim 1 further comprising a hydrophilic group containing polymer to be blended with said unsaturated metallic soap film forming binder.

5. A hydrolyzable antifouling coating composition as claimed in claim 1, wherein said metal is selected from the group consisting of the metals belonging to Group Ib, IIa, IIb, IIIa, IIIb, IVa, IVb, Va, Vb, VIIa and VIII.

6. A hydrolyzable antifouling coating composition as claimed in claim 1, wherein said unsaturated organic acid is an unsaturated fatty acid which is selected from the group consisting of oleic acid, linoleic acid, linolenic acid, oleostearic acid, laconic acid, ricinoleic acid, erucic acid.

7. A hydrolyzable antifouling coating composition as claimed in claim 1, wherein said unsaturated organic acid is an unsaturated fatty acid which is obtained from an oil selected from the group consisting of castor oil, soybean oil, corn oil, cotton seed oil, linseed oil, oiticica oil, perilla oil, poppyseed oil, rapeseed oil, safflower oil, sunflower oil, tall oil, tung oil, walnut oil, herring oil, menhaden oil and sardine oil.

8. A hydrolyzable antifouling coating composition as claimed in claim 2, wherein said organic acid is selected from the group consisting of acetic acid, propionic acid, butyric acid, valeric acid, caproic acid, caprylic acid, capric acid, lauric acid, myristic acid, palmitic acid, stearic acid, benzoic acid, phathalic acid, toluic acid, salicylic acid, nitrobenzoic acid, chlorobenzoic acid, toluene sulfonic acid, naphthenic acid, rosinic acid, and a natural fatty acid.

9. A hydrolyzable antifouling coating composition as claimed in claim 2, wherein said saturated organic acid is a polymeric acid containing a polymeric group selected from an acrylic copolymer, a vinyl copolymer containing styrene sulfonic acid, and a polyester prepared from a polyfunctional alcohol and polyfunctional acid.

10. A hydrolyzable antifouling coating composition as claimed in claim 4, wherein said hydrophilic group containing polymer is selected from the group consisting of a rosin, an acrylic polymer, a polyester and a hydrophilic group containing polyurethane.

11. A hydrolyzable antifouling coating composition as claimed in claim 5 wherein said antifouling agent is CuO.

12. A method of protecting the body of a ship, comprising: applying a hydrolyzable antifouling coating composition on the surface of said ship body to form a protective film which can be gradually hydrolyzed in marine water to consecutively produce a smooth and fresh surface, said coating composition comprising:

(a) a metallic soap film-forming binder; and (b) an effective amount of an antifouling agent which is a metallic compound other than the metallic soap of (a); said metallic soap film-forming binder having a general formula $$(R_1-A_1)_n-M-(A_2-R_2)_m$$

wherein $R_1$ is an alkenyl group derived from an unsaturated fatty acid or alcohol, M is a metal having a valency of at least 2, $A_1$ and $A_2$ are independently a functional group of a carboxylic acid, a sulfonic acid or a phosphoric acid, $R_2$ is an unsaturated or saturated residue of an aliphatic, aromatic, alicyclic monovalent organic acid or alcohol, or an acrylic oligomer, and each of n and m = 1 or 2, and n+m = 2 or 3; and wherein said metallic soap film-forming binder is prepared by reacting a metal compound containing a metal having a valency of at least 2 with a reaction composition comprising at least an unsaturated fatty acid or alcohol, and said metallic soap film-forming binder acts as a film-forming binder for said antifouling agent.

* * * * *